US011692974B2

(12) United States Patent
Werner et al.

(10) Patent No.: US 11,692,974 B2
(45) Date of Patent: Jul. 4, 2023

(54) ULTRASONIC TESTING FOR ADDITIVE MANUFACTURED COMPONENTS

(71) Applicant: Baker Hughes Oilfield Operations LLC, Houston, TX (US)

(72) Inventors: Daniel Werner, Hurth (DE); Andreas Franzen, Hurth (DE)

(73) Assignee: Baker Hughes Oilfield Operations LLC, Houston, TX (US)

( * ) Notice: Subject to any disclaimer, the term of this patent is extended or adjusted under 35 U.S.C. 154(b) by 380 days.

(21) Appl. No.: 16/998,080

(22) Filed: Aug. 20, 2020

(65) Prior Publication Data

US 2022/0057369 A1    Feb. 24, 2022

(51) Int. Cl.
*G01N 29/22* (2006.01)
*G01N 29/04* (2006.01)
*G01N 29/24* (2006.01)
*B33Y 80/00* (2015.01)
*B33Y 10/00* (2015.01)
(Continued)

(52) U.S. Cl.
CPC .......... *G01N 29/223* (2013.01); *B29C 64/118* (2017.08); *B33Y 10/00* (2014.12); *B33Y 50/02* (2014.12); *B33Y 80/00* (2014.12); *G01N 29/04* (2013.01); *G01N 29/221* (2013.01); *G01N 29/24* (2013.01); *G01N 2291/0231* (2013.01);
(Continued)

(58) Field of Classification Search
CPC ...... G01N 29/223; G01N 29/04; G01N 29/24; G01N 2291/0231; G01N 2291/0289; G01N 2291/101; B33Y 10/00; B33Y 50/02; B33Y 80/00; B29C 64/118

USPC ........................................................... 73/629
See application file for complete search history.

(56) References Cited

U.S. PATENT DOCUMENTS 5,576,492 A * 11/1996 Phalin .................. G01N 29/225
                                                      73/629
7,444,876 B2    11/2008 Sarr et al.
(Continued)

FOREIGN PATENT DOCUMENTS

JP    2019219179 A  * 12/2019
JP    2019219179 A    12/2019
(Continued)

OTHER PUBLICATIONS

Translation JP 2019219179 (Year: 2019).*
(Continued)

*Primary Examiner* — Alexander A Mercado
*Assistant Examiner* — Monica S Young
(74) *Attorney, Agent, or Firm* — Mintz Levin Cohn Ferris Glovsky and Popeo, PC (57) ABSTRACT

A device for use in inspecting a test object is provided. The device can include a body including a first end and a second end. The second end can be opposite the first end. The device can also include a probe receiver located at the first end of the body. The probe receiver can be configured to receive an ultrasonic probe. The device can further include a coupling portion located at the second end of the body. The coupling portion can be configured to position the ultrasonic probe with respect to an axis of force transmission of a test object or normal to one or more material layers of the test object during an ultrasound inspection of the test object. Methods of forming the device and performing ultrasonic inspection of a test object with the device are also provided.

19 Claims, 8 Drawing Sheets

(51) Int. Cl.
    *B29C 64/118*     (2017.01)
    *B33Y 50/02*     (2015.01)

(52) U.S. Cl.
    CPC ............... *G01N 2291/0289* (2013.01); *G01N 2291/101* (2013.01)

(56) References Cited

U.S. PATENT DOCUMENTS

| | | | |
|---|---|---|---|
| 7,690,259 | B2 | 4/2010 | Bui et al. |
| 10,444,110 | B2 | 10/2019 | Hartwig et al. |
| 2007/0044564 | A1* | 3/2007 | Bui ............... G01N 29/043 73/618 |
| 2014/0102201 | A1* | 4/2014 | Brignac ............ G01N 29/225 73/592 |
| 2015/0135840 | A1* | 5/2015 | Sato ............... G01N 29/28 73/644 |
| 2015/0338381 | A1* | 11/2015 | Clarkson ............ G01S 7/539 73/644 |
| 2016/0325541 | A1 | 11/2016 | Lavrentyev et al. |
| 2017/0336366 | A1 | 11/2017 | Badeau et al. |
| 2018/0036964 | A1* | 2/2018 | DehghanNiri ........ B29C 64/393 |
| 2018/0238835 | A1* | 8/2018 | Estevo ............... G01N 29/28 |
| 2019/0302063 | A1* | 10/2019 | Hadimioglu ........ G10K 11/02 |
| 2019/0331644 | A1 | 10/2019 | Bodily et al. |
| 2020/0072796 | A1* | 3/2020 | Fiseni ............... G01N 29/223 |
| 2021/0396717 | A1* | 12/2021 | Fiseni ............... G01N 29/24 |

FOREIGN PATENT DOCUMENTS

| | | | |
|---|---|---|---|
| KR | 20160142019 A | * | 12/2016 |
| KR | 20160142019 A | | 12/2016 |

OTHER PUBLICATIONS

Translation KR-20160142019 (Year: 2016).*
Written Opinion and PCT International Search Report received for PCT Application No. PCT/US2021/071186, dated Nov. 29, 2021, 11 pages.
Cummings et al., "In-Process Ultrasonic Inspection of Additive Manufactured Parts", Topics in Modal Analysis & Testing, vol. 10, May 17, 2016, 235-247.

* cited by examiner

ULTRASONIC TESTING FOR ADDITIVE MANUFACTURED COMPONENTS

BACKGROUND

Non-destructive testing (NDT) is a class of analytical techniques that can be used to inspect characteristics of a component or a test piece, without causing damage, to ensure that the inspected characteristics satisfy required specifications. For this reason, NDT can be used in a number of industries such as aerospace, automotive, power generation, oil and gas transport or refining where component failures would be catastrophic.

Ultrasonic testing is one type of NDT. Ultrasound is acoustic (sound) energy in the form of waves that have an intensity (strength), which varies in time at a frequency above the human hearing range. In ultrasonic testing, an ultrasonic probe can generate one or more ultrasonic waves and these waves can be directed towards a test object. As the ultrasonic waves contact and penetrate the test object, they can reflect from features such as outer surfaces, internal structural components, and defects which can be present in the materials of the test object (e.g., cracks, porosity, etc.). Analyzing the reflected ultrasonic wave signals can be useful to determine characteristics of test objects.

Additive manufacturing, also known as three-dimensional (3D) printing, used computer-aided-design (CAD) software or 3D object scanners to direct hardware to deposit material in layers to form precise geometric shaped. Each successive layer bonds to the preceding layer of melted or partially melted material. It can be possible to use different substances for layering material, including metal powder, thermoplastics, ceramics, composites, and glass. Objects can be digitally defined by CAD software that can be used to create files that essentially "slice" the object into ultra-thin layers. This information can guide the path of a nozzle or print head as it precisely deposits material upon the preceding layer. In some applications, a laser or an electron beam can selectively melt or partially melt amounts of material within in a bed of powdered material. As the materials previously melted material cools or cures, the materials can fuse together to form a three-dimensional object. Test objects formed via additive manufacturing can be inspected using ultrasonic inspection methods.

SUMMARY

In one aspect, a method for forming an adaptor for use in inspecting a test object is provided. In some embodiments, the method can include receiving data characterizing a test object to be inspected via ultrasonic inspection. The test object can be formed using a first additive manufacturing technique. The method can also include forming an adaptor for use in inspecting the test object. The adaptor can be formed via the first additive manufacturing technique. The adaptor can be formed to include a probe receiver and a coupling portion. The probe receiver can be configured to receive an ultrasonic probe and a coupling portion can be configured to position the ultrasonic probe with respect to an axis of force transmission of the test object.

In another aspect, a device for use in inspecting a test object is provided. In some embodiments, the device can include a body including a first end and a second end. The second end can be opposite the first end. The device can also include a probe receiver located at the first end of the body. The probe receiver can be configured to receive an ultrasonic probe. The device can further include a coupling portion located at the second end of the body. The coupling portion can be configured to position the ultrasonic probe with respect to an axis of force transmission of a test object or normal to one or more material layers of the test object during an ultrasound inspection of the test object.

In another aspect, a method for performing ultrasonic inspection of a test objecting is provided. In some embodiments, the method can include forming an adaptor for use in inspecting a test object via ultrasonic inspection. The adaptor can be formed to include a probe receiver and a coupling portion. The probe receiver can be configured to receive an ultrasonic probe and a coupling portion configured to position the ultrasonic probe with respect to an axis of force transmission of the test object. The adaptor and the test object can be formed using an additive manufacturing technique. The method can also include affixing the adaptor to the test object. The method can further include positioning the ultrasonic probe with respect to the adaptor. The method can also include performing ultrasonic inspection of the test object.

BRIEF DESCRIPTION OF THE DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure. Like-numbered references are used throughout the drawings to denote components which are similar, except where described otherwise. Those skilled in the art will understand that the systems, devices, and methods specifically described herein and illustrated in the accompanying drawings are non-limiting exemplary embodiments and that the scope of the present invention is defined solely by the claims.

DETAILED DESCRIPTION

Additive manufacturing can provide advantages for prototyping and manufacture of 3D objects. The advantages can include increased flexibility during product development and manufacturing and cost savings. Additive manufacturing eliminates the need for specialized manufacturing tools or molds, which can be required for objects with complex 3D geometries in non-additive manufacturing. Objects formed via additive manufacturing can be lighter-weight due to material topology optimization and the materials (or combination of materials) can be formed into structural designs, which can be infeasible or cost-prohibitive using non-additive manufacturing.

Advances in additive manufacturing has enabled prototyping and production of safety-critical objects, such as components of turbine engines. Such objects can often require inspection and certification before being deployed for use. Inspecting these geometrically complex objects for features such as structural flaws and material defects can be challenging using ultrasonic inspection. For example, the features can include cavities, voids, missing backwalls, inconsistent surface geometry, lack of suitable probe coupling locations, and undercuts in complex objects. Computer-aided tomographic inspection can be expensive and require suitably sized chambers large enough to accommodate the object. Ultrasonic inspection can require the objects to be disassembled in order to perform the inspection. For example, ultrasonic inspection of dissembled parts can be performed in a fluid-filled tank. However, the fluid can remain within the part based on the geometry or porosity of the part. As a result, subsequent inspection measurements and the structural integrity of the object can be adversely affected.

The subject matter herein describes an adaptor for use in performing ultrasonic inspections of additive manufactured objects. The adaptor can couple an ultrasonic probe and the beam emitted from the ultrasonic probe to a test object. The adaptor can provide an alignment interface enabling the ultrasonic probe to be accurately positioned with respect to an axis or axes of force transmission within the object being tested. The adaptor can enable the ultrasonic inspection to occur along an axis or axes of force transmission that exist within the test object. Additive manufacturing can optimize material topologies of objects such that larger amounts of material are formed along a flux of forces of the object. The flux of forces can include an axis or axes of force transmission present within the object based on the material topology of the object. Forces, such as torsion, are transmitted within the object along the axes of force transmission and require material formations without interruptions or defects to ensure the object functions as designed. Inspecting additive manufactured objects, which include complex geometries with respect to their axes or flux of force transmission, using the adaptor described herein can improve accuracy and reduce inspection time of ultrasonic inspections compared to existing ultrasonic inspection approaches.

The adaptor and methods of use described herein provide an improved approach to performing ultrasonic testing for additive manufactured objects with complex geometries. For example, the adaptor can be formed by additive manufacturing. The adaptor can couple to a test object with a complex surface geometry with more precision due to the ability to adjust the alignment interface. The adaptor can be formed, via additive manufacturing, from the same material as the object being inspected, which can reduce the influence of materials on the inspection results. The adaptor can enable more accurate ultrasonic testing because of the ability to position an ultrasonic probe with respect to the axes or flux of forces of the test object. In this way, features of complex objects formed via additive manufacturing, can be efficiently and accurately inspected. Inspection of object features, such as missing backwalls, cavities, undercuts, complex surface geometries, and lack of probe-to-object coupling interfaces, can be advantageously performed using the adaptor and methods described herein compared to existing approaches of ultrasonic inspection.

In general, methods and devices are provided for performing ultrasonic inspection of test objects formed via additive manufacturing techniques. Embodiments of a method for forming an adaptor via additive manufacturing for use in ultrasonically testing safety-critical industrial equipment is disclosed herein. In addition, a method for performing ultrasonic inspection of safety-critical industrial equipment formed via additive manufacturing is also disclosed herein. The disclosure also includes embodiments of an adaptor formed via additive manufacturing techniques for use performing ultrasonic inspection of safety-critical industrial equipment formed via additive manufacturing is also disclosed herein is also disclosed herein. However, embodiments of the disclosure can be employed for performing ultrasonic testing of test objects without limit. For example, the disclosure can be utilized to perform ultrasonic inspection of test objects, which are not associated with industrial equipment or safety-critical applications without limitation. Additionally, or alternatively, the disclosure can be employed to perform ultrasonic inspection of test objects, which have not been formed via additive manufacturing without limitation. In some embodiments, the method can be performed to form an adaptor for use in performing ultrasonic inspection of a test object to determine a specified design, prototype, and/or manufactured configuration of the test object.

Figure 1:
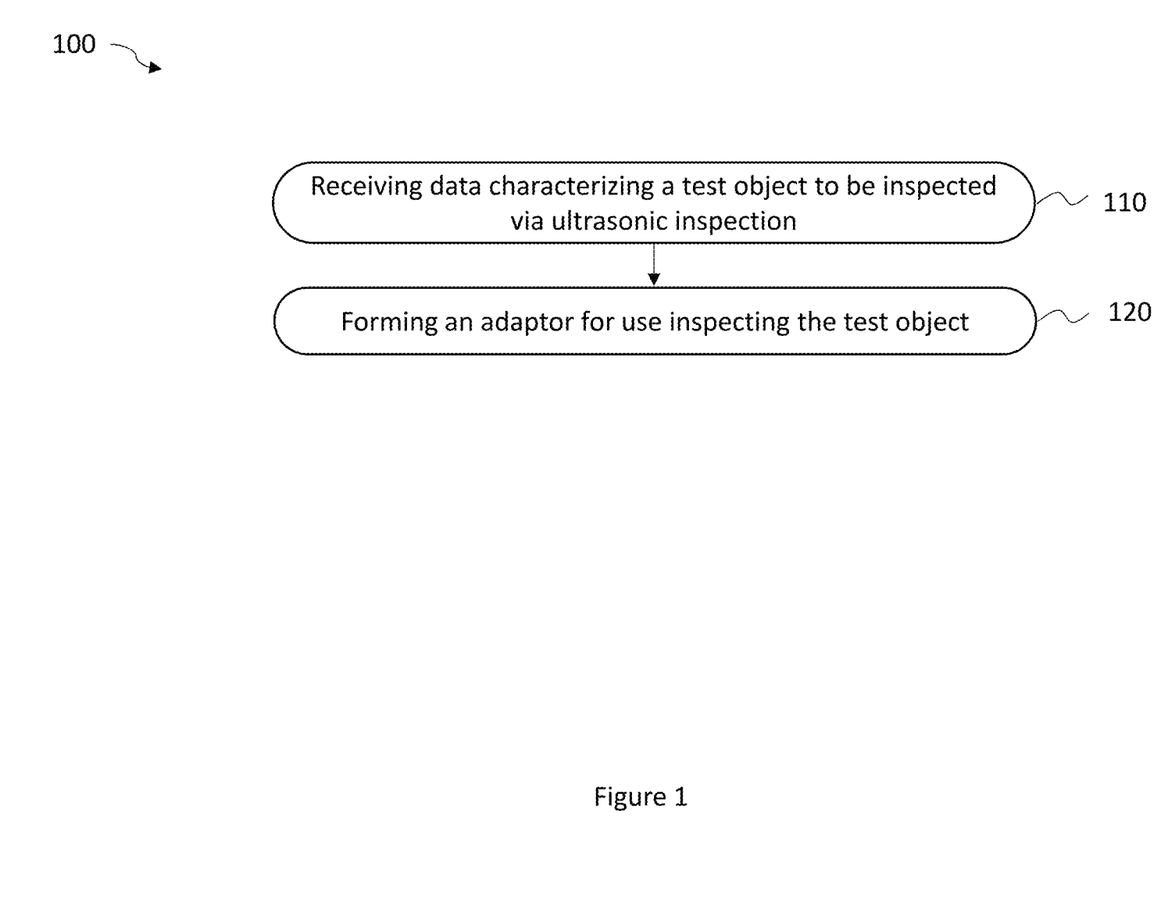
FIG. 1 is a flow diagram illustrating an exemplary embodiment of a method for forming an adaptor for use inspecting a test object via ultrasonic inspection.

FIG. 1 illustrates one exemplary embodiment of a method 100 for forming an adaptor for use inspecting a test object via ultrasonic inspection. In operation 110, a test object to be inspected via ultrasonic inspection can be determined. The test object can be determined to be the object to be inspected. The test object can be formed via additive manufacturing. For example, the test object can be formed by material extrusion, powder be fusion, material jetting, directed energy deposition, sheet lamination, vat photopolymerization, fused deposition modeling (FDM), selective laser melting (SLM), laser sintering, stereolithography, laser cladding, or the like. In some embodiments, the test object may not be formed via additive manufacturing.

In operation 120, an adaptor for use inspecting the test object can be formed. In some embodiments, the adaptor can be formed using the same additive manufacturing approach that was used to form the test object. For example, the adaptor can be formed by material extrusion, powder be fusion, material jetting, directed energy deposition, sheet lamination, vat photopolymerization, fused deposition modeling (FDM), selective laser melting (SLM), laser sintering, stereolithography, laser cladding, or the like. In some embodiments, the adaptor can be formed from the same materials as the test object. For example, the adaptor can be formed from polymers, ceramics, or metals. Forming the adaptor from the same material as the test object can reduce the affect material differences between the adaptor and the test object can have on the ultrasonic inspection results.

In some embodiments, prior to forming the adaptor, as described in operation 120, the method can further include determining one or more axes of force transmission of the test object. The axes or flux of force transmission can be determined based on the material topology of the test object. The axes of force transmission can include two points or areas of the test object through with forces, such as torsion, can be transmitted through the test object. In some embodiments, the one or more axes of force transmission can be determined based on one or more locations of the test object that are included in a file provided by a 3D CAD application. For example, the file can include a .stl, a .STEP, a .IGES, or similar file format. In this example, .stl files can store information about 3D models and can be processed by additive manufacturing systems to form an object according to the .stl file data.

Axes of force transmission can be determined while designing a test object and can be provided by the design application, such as a CAD application. The axes of force transmission can also be determined using finite element methods performed during finite element analysis of the test object when surrounding forces, such as torque, are known. In some embodiments, the axes of force transmission can be determined based on an orientation of material layers formed using additive manufacturing techniques. For example, in test objects formed using fused deposition modeling (FDM), the axes of force transmission can be determined based on inspection views that are oriented normal to the material layers. In this way, proper bonding between material layers can be assessed and used to determine the axes of force transmission of the test object. In some embodiments, the one or more axes of force transmission can be performed by visual inspection of the test object.

The adaptor can be formed to include a probe receiver configured to receive an ultrasonic probe within the adaptor. The adaptor can also be formed to include a coupling portion configured to position the ultrasonic probe with respect to an axes of force transmission of the test object. The coupling portion can be formed to include an alignment interface configured to provide an interface of continuous contact between the adaptor and the surface of the test object through which an axis of force transmission extends. The coupling portion can be formed in a variety of dimensions and geometries to correspond to the surface of the test object.

Figure 2A:
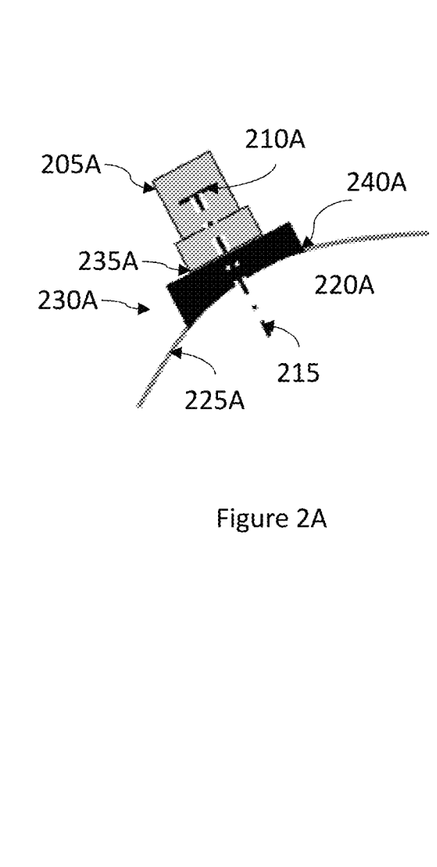
FIGS. 2A-2C are diagrams illustrating exemplary embodiments of adaptors for use inspecting a test object via ultrasonic inspection.
Figure 2B:
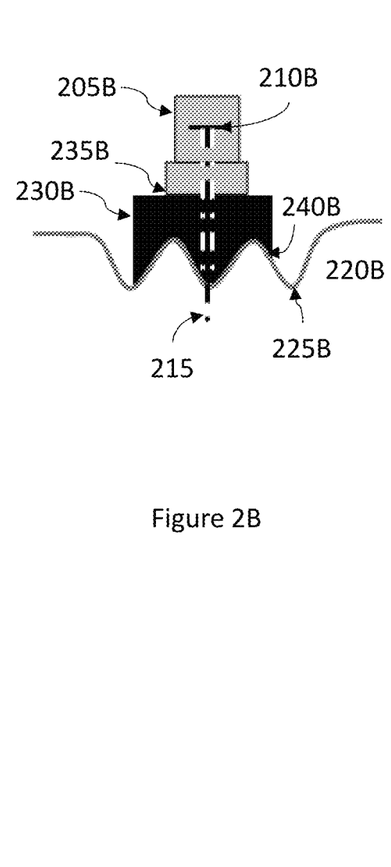
Figure 2C:
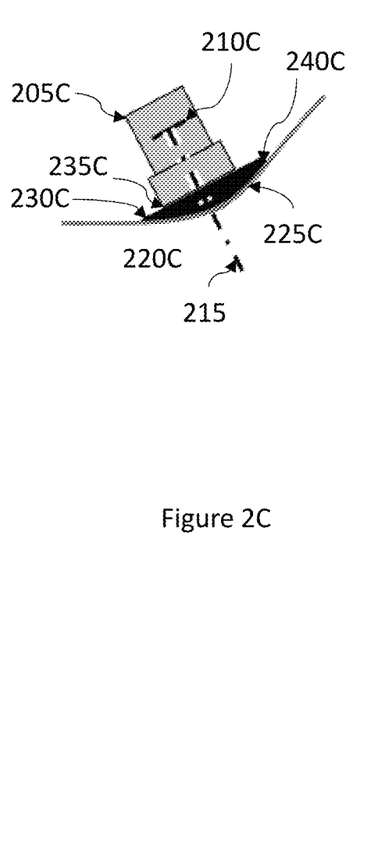

FIGS. 2A-2C are diagrams illustrating three exemplary embodiments of adaptors for use inspecting a test object via ultrasonic inspection. The adaptors shown and described in relation to FIGS. 2A-2C can be formed via the method shown and described in relation to FIG. 1. As shown in FIGS. 2A-2C, adaptors can formed to couple an ultrasonic probe with a variety of test object surface shapes.

As shown in FIG. 2A, an ultrasonic probe, e.g., probe 205A can include an ultrasonic transducer 210A. The transducer 210A can be configured to transmit ultrasonic signals into the test object and to receive ultrasonic signals reflected by the test object. The transducer 210A can transmit and receive ultrasonic signals 215 with respect to the test object 220A. In FIG. 2A, the test object 220A includes a convex-shaped surface 225A. The adaptor 230A can be formed to match the shape of the surface 225A. The adaptor 230A includes a probe receiver 235A, at which the probe 205A is received to be coupled with the adaptor 230A. The adaptor 230A also includes a coupling portion 240A. The coupling portion 240A can be formed to match the geometry and dimensions of the test object surface 225A. The surface of the coupling portion 240A opposite and in contact with the surface 225A of the test object can form an alignment interface. As shown in FIG. 2A, the alignment interface and the coupling portion 240A can be concave-shaped to provide continuous contact with the convex-shaped surface 225A of the test object 220A at which an axis of force transmission can extend.

In FIG. 2B, another exemplary embodiment of adaptor 230B can be seen. The adaptor 230B can include a coupling portion 240B configured with a plurality of grooves or notches, which can receive and mate with the protrusions of the surface 225B of the test object 220B. The alignment interface formed on the surface of the coupling portion 240B that is opposite and in contact with the surface 225B can be formed to be complimentary to the protrusion shapes of the surface 225B. In this way, the alignment interface formed by the coupling portion 240B can position the adaptor 230B in continuous contact with the surface 225B.

In FIG. 2C, another exemplary embodiment of adaptor 230 can be seen. The adaptor 230C can include a convex-shaped coupling portion 240C configured to provide a similarly-shaped alignment interface to match the concave-shaped surface 225C of test object 220C.

A variety of shapes and configurations of the adaptor 230, probe receiver 235, coupling portion 240, and alignment interfaces can be considered within the scope of this disclosure without limitation. Forming the adaptor via additive manufacturing can enable a non-limiting variety of adaptor shapes to provide an alignment interface in continuous contact with the surface 225 of a test object 220 at which an axis of force transmission extends from the test object 220.

Figure 3:
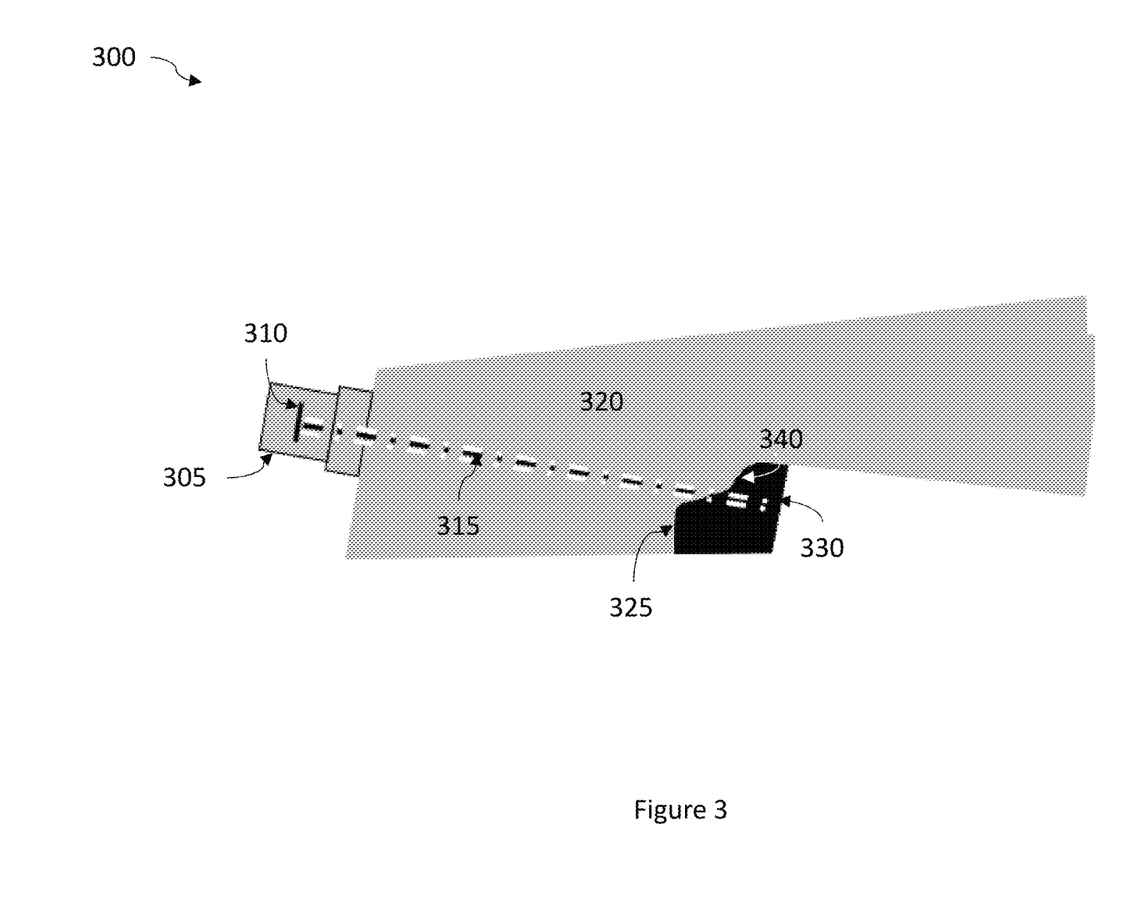
FIG. 3 is a diagram illustrating an exemplary embodiment of an adaptor for use inspecting a test object, which does not include a backwall, via ultrasonic inspection.

FIG. 3 is a diagram 300 illustrating an exemplary embodiment of an adaptor 330 for use inspecting a test object 320, which does not include a backwall, via ultrasonic inspection. As shown in FIG. 3, the test object includes an under cut at which a backwall missing. The missing backwall can cause the ultrasonic signals 315 emitted by transducer 310 to be diffused into the test object 320 and not reflected back to the transducer 310. This type of test object geometry can limit the accuracy of the ultrasonic inspection of additive manufactured objects. The adaptor 330 can address this issue by providing a backwall that is orthogonal to the ultrasonic signals 315 emitted from the transducer 310. As shown in FIG. 3, the adaptor 330 includes a coupling portion 340 shaped to as to provide an alignment interface in continuous contact with the surface 325 of the test object 320.

Figure 4:
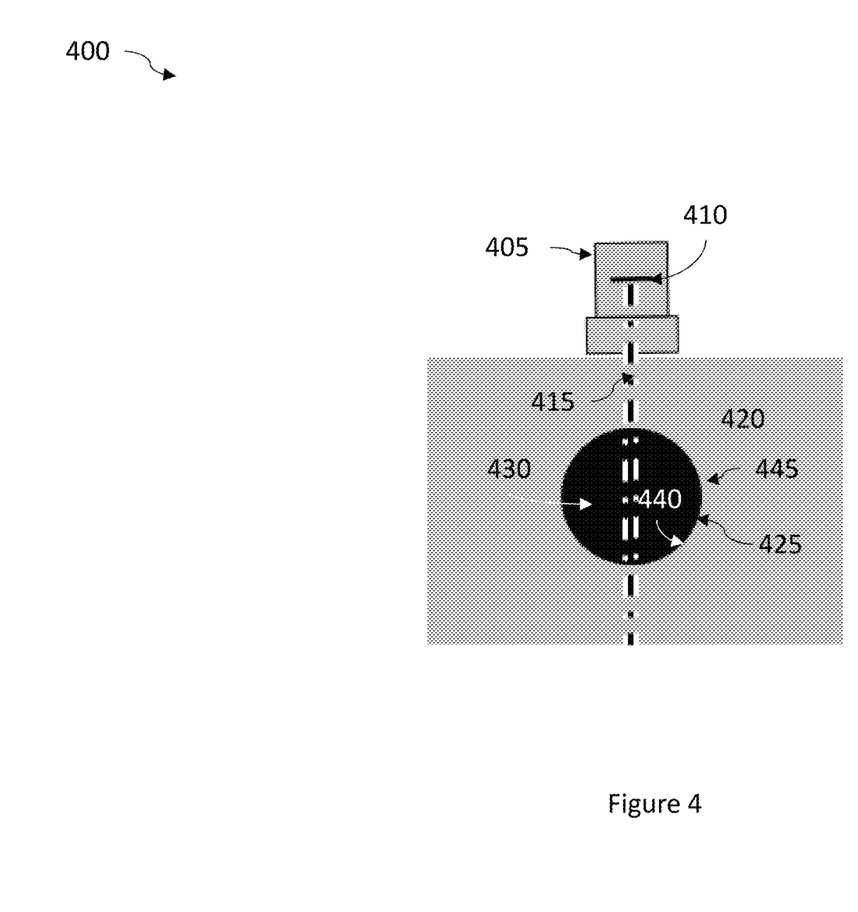
FIG. 4 is a diagram illustrating another exemplary embodiment of an adaptor for use inspecting a test object with a hole therein via ultrasonic inspection.

FIG. 4 is a diagram 400 illustrating another exemplary embodiment of an adaptor 430 for use inspecting a test object 420 with a hole 445 therein via ultrasonic inspection. Test objects including cavities or holes can be difficult to inspect ultrasonically because the cavity or hole can create an acoustic dead zone where no ultrasonic signals are reflected due to the lack of test object material at the location where the cavity or hole is present. The adaptor 430 can address this issue by being formed via additive manufacturing to include a circular-shaped coupling portion 440. The coupling portion 440 can thus provide a circular-shaped alignment interface which matches and is in continuous contact with the surface 425 of the hole 445. This can enable the adaptor 430 to be positioned within the hole 445 and to simulate test object material for proper reflection of the ultrasonic signals 415 back to the transducer 410.

Figure 5:
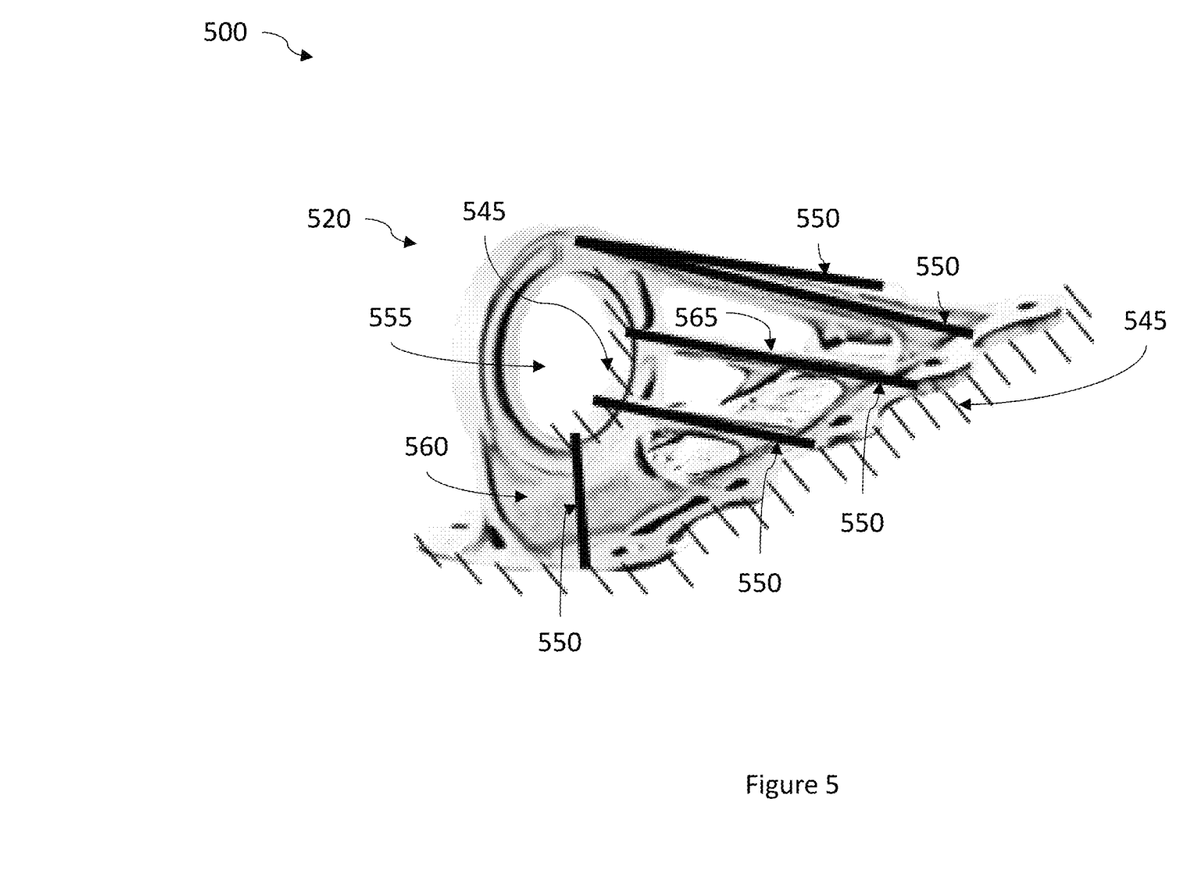
FIG. 5 is a diagram illustrating an exemplary embodiment of a test object including multiple axes of force transmission.

FIG. 5 is a diagram 500 illustrating an exemplary embodiment of a test object 520 including multiple axes of force transmission 550. The test object 520 shown in FIG. 5 can be a structural support or bracket. For example, the test object 520 can be a bracket that can be affixed to a flat surface of a base structure. A rotating member can extend through the circular opening 555 configured on the left side of the test object 520. The test object 520 can include multiple locations 545, shown by areas of diagonal lines, where force, such as torque, can be applied to the test object 520. For example, force can be applied to the test object 520 on the inner surface 545 of the circular opening 555 at which the rotating member can exert torque on the inner surface 545. Force can also be applied to the test object 520 along the flat surface on the bottom of the bracket where the bracket can be affixed to a base structure.

As shown in FIG. 5, multiple axes 550 of force transmission can be determined for the test object 520. The axes 550 can be determined based on the material topology and geometry of the test object 520 formed via additive manufacturing. The axes 550 can be present where continuous amounts of material are present and where the test object 520 is most likely to receive and convey forces through the materials. As shown in FIG. 5, the axes 550 can be in positions that are associated with the base column 560 supporting the circular opening 555 and any of the angled support arms 565 coupling the circular opening 555 to the flat surface on the bottom of the bracket.

Figure 6:
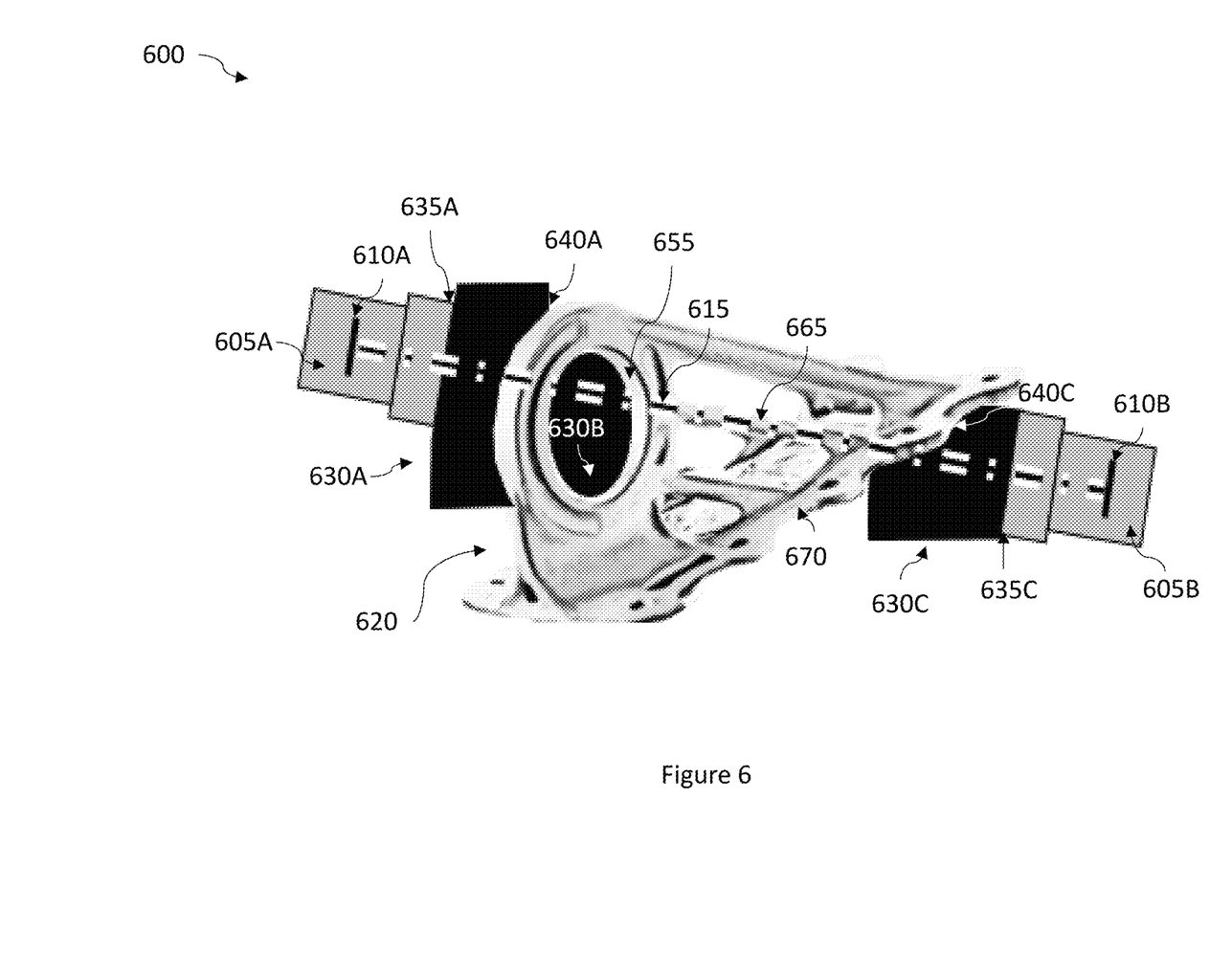
FIG. 6 is a diagram illustrating an exemplary embodiment of adaptors for use inspecting a test object including multiple axes of force transmission.

FIG. 6 is a diagram 600 illustrating an exemplary embodiment of multiple adaptors for use inspecting a test object including multiple axes of force transmission. The test object 620 shown in FIG. 6 corresponds to the test object 520 shown and described in relation to FIG. 5. The embodiment shown and described in relation to FIG. 6 can be used to perform ultrasonic inspection of additive manufactured test objects using two probes. For example one probe can be configured as a transmitter of ultrasonic signals and the other probe can be configured as a receiver of the ultrasonic signals. The probes shown and described in relation to FIG. 6 can include one or more adaptors as will described further.

As shown in FIG. 6, a first probe 605A can be positioned for ultrasonic inspection of the test object 620 using a first adaptor 630A. The first adaptor 630A can include a probe receiver 635A to receive the probe 605A and a coupling portion 640A configured to position the probe 605A along an axis of force transmission of the test object 620. The probe 605A can be configured to transmit ultrasonic signals 615 into the test object 620. The ultrasonic signals 615 can be transmitted along an axis of force determined to be located and extend along the angle support arm 665 coupling the circular opening 655 to the flat surface 670. The first adaptor 630A includes a coupling portion 640A which can provide an alignment interface with the flat surfaces of the test object 620 in which the circular opening 655 is located. In some embodiments, one or more adaptors 630 can be coupled together. For example, as shown in FIG. 6, a second adaptor 630B can be configured to pass the ultrasonic signals 615 through the circular opening 655. The adaptor 630B can be coupled to the adaptor 630A.

As further shown in FIG. 6, a third adaptor 630C can be used to couple a second probe 605B to the test object 620. The second probe 605B can be configured to receive the ultrasonic signals 615 via the transducer 610B. The third adaptor 630C can include a probe receiver 635C and a coupling portion 640C. The coupling portion 640C can provide an alignment interface of continuous contact between the adaptor 630C and the portion of the flat surface 670 at which the axis of force transmission extends from the test object 620. In some embodiments, the transducer 610A can be configured to transmit and receive the ultrasonic signals 615 and in such embodiments, the adaptor 630C can generate a backwall signal to be received at the transducer 610A.

Figure 7:
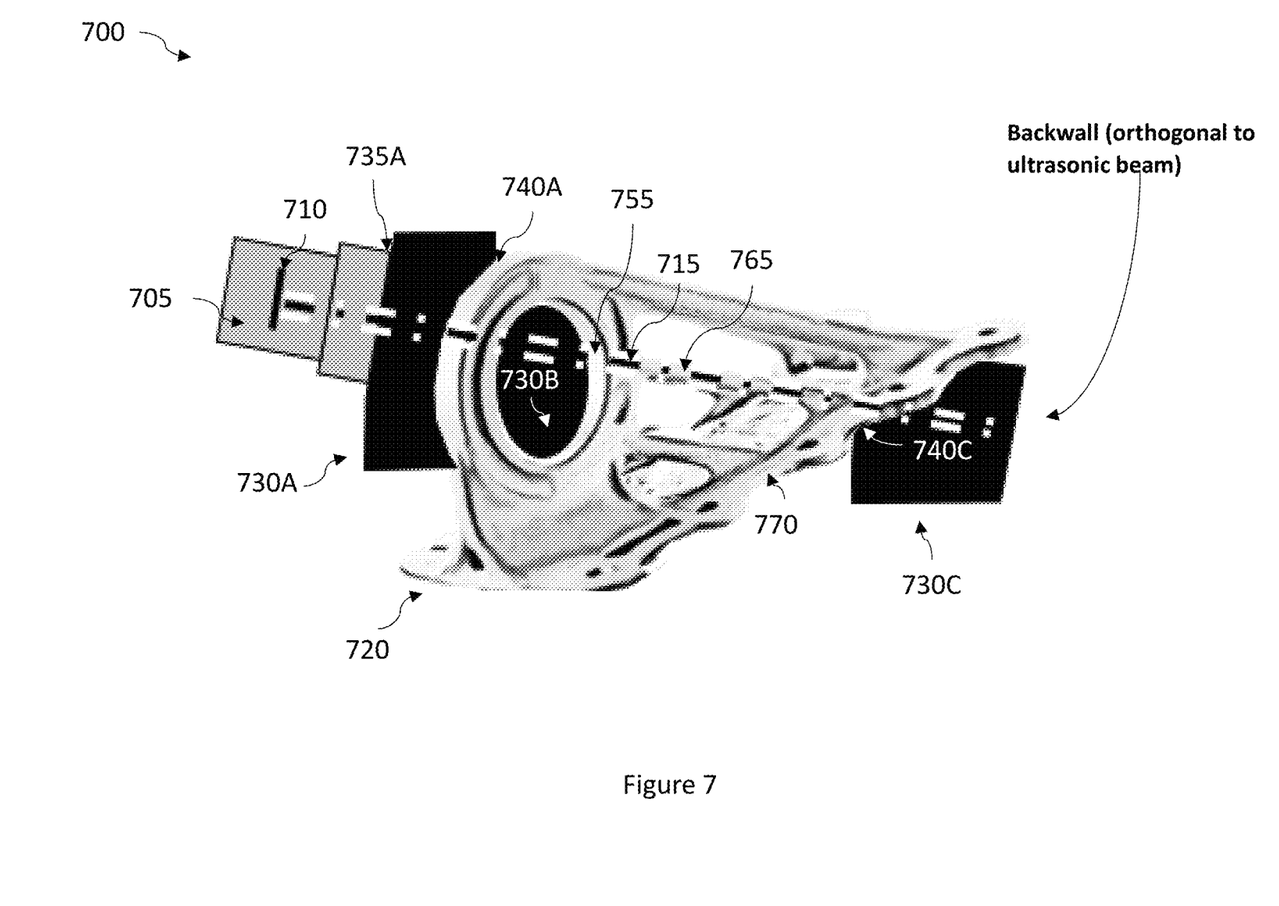
FIG. 7 is a diagram illustrating another exemplary embodiment of adaptors for use inspecting a test object including multiple axes of force transmission.

FIG. 7 is a diagram 700 illustrating another exemplary embodiment of multiple adaptors for use inspecting a test object 720 including multiple axes of force transmission. The test object 720 shown in FIG. 7 corresponds to the test object 520 and 620 shown and described in relation to FIGS. 5-6. The embodiment shown and described in relation to FIG. 7 can be used to perform ultrasonic inspection of additive manufactured test objects using a single probe. For example one probe can be configured as a transmitter of ultrasonic signals and a receiver of the ultrasonic signals. The configuration described in relation to FIG. 7 can be associated with an impulse-echo-inspection mode of an ultrasonic probe. The probe shown and described in relation to FIG. 7 can include one or more adaptors as will described further.

As shown in FIG. 7, probe 705 can be positioned for ultrasonic inspection of the test object 720 using a first adaptor 730A. The first adaptor 730A can include a probe receiver 735A to receive the probe 705 and a coupling portion 740A configured to position the probe 705 with respect to an axis of force transmission of the test object 720. The probe 705 can be configured to transmit and to receive ultrasonic signals 715. The ultrasonic signals 715 can be transmitted along an axis of force determined to be located and extend along the angle support arm 765 coupling the circular opening 755 to the flat surface 770. The adaptor 730A includes a first coupling portion 740A which can provide an alignment interface with the flat surfaces of the test object 720 in which the circular opening 755 is located. In some embodiments, one or more adaptors 730 can be coupled together. For example, as shown in FIG. 7, a second adaptor 730B can be configured to pass ultrasonic signals 715 through the circular opening 755. The adaptor 730B can be coupled to the adaptor 730A and can fill the circular opening 755 to pass the ultrasonic signals 715 into the test object 720 through the circular opening 755.

As further shown in FIG. 7, a third adaptor 730C can be used to simulate backwall material which can be missing from the test object 720. The third adaptor 730C can be positioned to ensure the ultrasonic signals 715 are reflected orthogonally by the third adaptor 730C back to the probe 705. In this way, the adaptor 730C can generate a backwall signal to be received at the transducer 710. The third adaptor 730C can include a coupling portion 740C. The coupling portion 740C can provide an alignment interface of continuous contact between the adaptor 730C and the portion of the flat surface 770 at which the axis of force transmission 765 extends from the test object 720.

Figure 8:
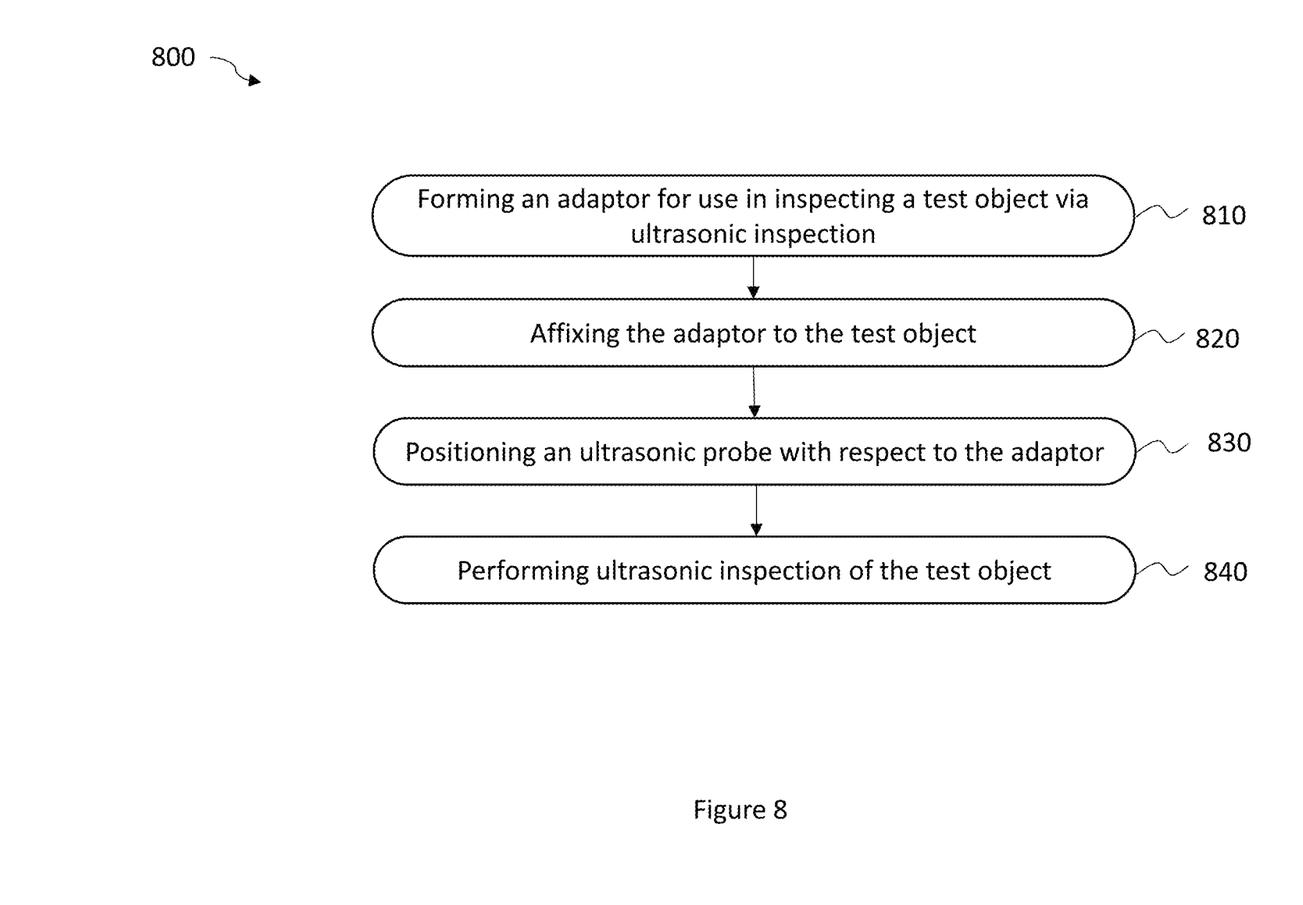
FIG. 8 is a flow diagram illustrating an exemplary embodiment of a method for performing ultrasonic inspection of a test object using the adaptor of FIGS. 2-7.

FIG. 8 is a flow diagram illustrating an exemplary embodiment of a method 800 for performing ultrasonic inspection of a test object using any of the embodiments of the adaptors 230, 330, 430, 630, and 730 shown and described in relation to FIGS. 2-4 and 6-7. In operation 810, an adaptor is formed for using in inspecting a test object via ultrasonic inspection. The adaptor can be formed according to the method shown and described in relation to FIG. 1.

In operation 820, the adaptor can be affixed to the test object. The adaptor can be affixed to the test object via a coupling portion of the adaptor. The coupling portion can be formed to include an alignment interface which provides continuous contact between the adaptor and a surface of the test object at which an axis of force transmission extends from the test object. In some embodiments, a coupling medium, such as a gel, glycerin, oil, water, or the like can be used with the adaptor to ensure continuous contact between the adaptor and the surface of the test object is achieved. A coupling medium, as described, can ensure the alignment interface adequately compensates for any irregular surface properties of the test object and/or the coupling portion. The geometry and dimensions of the coupling portion can be configured via additive manufacturing to form an alignment interface which substantially matches or mates with the surface of the test object.

In operation 830, an ultrasonic probe can be positioned with respect to the adaptor. In some embodiments, the ultrasonic probe can be received within a probe receiver configured within the adaptor. In some embodiments, the ultrasonic probe can be coupled to the adaptor and the probe receiver via mechanical means, such as a threaded connection or a friction-fit connection. The ultrasonic probe can be positioned with respect to the adaptor to cause the probe to transmit and receive ultrasonic signals along an axis of force transmission extending from the test object at a particular location. The coupling portion of the adaptor can be further used to ensure the ultrasonic probe is probe is properly positioned with respect this axis of force transmission. In this way, ultrasonic inspection can proceed with greater confidence that inspection results accurately reflect the presence of continuous material formations within additive manufactured test objects. In operation 840, ultrasonic inspection of the test object can be performed.

Exemplary technical effects of the methods, and devices described herein include, by way of non-limiting example, forming an adaptor via additive manufacturing for use inspecting additive manufactured test objects with complex internal and surface geometries. The adaptor and methods described herein also enable performance of ultrasonic testing without disassembly and/or immersion of test objects, which can improve test accuracy and maintain test object integrity. In one aspect, the adaptor can be formed by the same additive manufacturing method and material as the test object. This can reduce any material-related test anomalies and errors and can provide a consistent material interface for ultrasonic signals to pass between the probe and the test object. In another aspect, forming the adaptor via additive manufacturing can provide a coupling portion of the adaptor that can include an alignment interface that can complement, match, or mate with the surface geometry of complex test objects. These features can enable more accurate, efficient, and lower-cost ultrasonic inspection of additive manufactured test objects.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Certain exemplary embodiments are described to provide an overview of the principles of the structure, function, manufacture, and use of the systems, devices, and methods disclosed herein. One or more examples of these embodiments are illustrated in the accompanying drawings. The features illustrated or described in connection with one exemplary embodiment can be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method comprising:
receiving, by at least one processor of an additive manufacturing system, three-dimensional data characterizing a test object to be inspected via ultrasonic inspection;
determining, by the at least one processor, one or more axes of force transmission of the test object based on the three-dimensional data characterizing the test object; and
forming, by the additive manufacturing system, a coupling portion of an adaptor for use in inspecting the test object, the adaptor including a probe receiver and the coupling portion, wherein the probe receiver is configured to receive an ultrasonic probe, and the coupling portion is formed via a first additive manufacturing technique to match a shape of a surface of the test object, and configured to position the ultrasonic probe with respect to an axis of force transmission of the test object.

2. The method of claim 1, wherein the coupling portion of the adaptor and the test object have been formed from identical additive manufacturing materials, the additive manufacturing materials including at least one of a polymer, a ceramic, or a metal.

3. The method of claim 1, wherein the first additive manufacturing technique includes at least one of vat polymerization material jetting, binder jetting, material extrusion, power bed fusion, sheet lamination, or direct energy deposition.

4. The method of claim 1, wherein the ultrasonic inspection is performed to determine a specified design configuration of the test object.

5. The method of claim 1, wherein forming the coupling portion of the adaptor includes forming an alignment interface within the coupling portion of the adaptor, the alignment interface configured to position the coupling portion in continuous contact with the surface of the test object through which the axis of force transmission extends at a first location.

6. A device, comprising:
at least one processor of an additive manufacturing system configured to determine one or more axes of force transmission of a test object based on three-dimensional data characterizing the test object
a body including a first end and a second end, the second end opposite the first end;
a probe receiver located at the first end of the body, the probe receiver configured to receive an ultrasonic probe; and
a coupling portion located at the second end of the body, the coupling portion formed using a first additive manufacturing technique to match a shape of a surface of the test object and configured to position the ultrasonic probe with respect to the one or more axes of force transmission of the test object determined by the at least one processor, during an ultrasound inspection of the test object.

7. The device of claim 6, wherein the test object is formed using additive manufacturing, and the coupling portion and the test object are formed from identical additive manufacturing materials.

8. The device of claim 7, wherein the additive manufacturing materials include at least one of a polymer, a ceramic, and a metal.

9. The device of claim 6, wherein the body, the probe, the coupling portion, and/or the test object are formed using an additive manufacturing technique including at least one of vat polymerization material jetting, binder jetting, material extrusion, power bed fusion, sheet lamination, or direct energy deposition.

10. The device of claim 6, wherein the test object is a component of an aircraft, an automobile, a valve, a compressor, a turbine, and/or an industrial equipment of an oil and gas production system.

11. The device of claim 6, further comprising an alignment interface configured to position the adaptor in continuous contact with a surface of the test object through which the axis of force transmission extends at a first location.

12. The device of claim 6, wherein the axis of force transmission includes an axis through which torsion is transmitted.

13. A method comprising:
    determining, by at least one processor of an additive manufacturing system, one or more axes of force transmission of a test object based on three-dimensional data characterizing a test object;
    forming, by the additive manufacturing system, a coupling portion of an adaptor for use in inspecting a test object via ultrasonic inspection, the adaptor including a probe receiver and the coupling portion, the probe receiver configured to receive an ultrasonic probe and the coupling portion formed using an additive manufacturing technique to match a shape of a surface of the test object and configured to position the ultrasonic probe with respect to the one or more a axes of force transmission of the test object;
    affixing the coupling portion of the adaptor to the test object;
    positioning the ultrasonic probe with respect to the adaptor; and
    performing ultrasonic inspection of the test object.

14. The method of claim 13, wherein the test object is formed using additive manufacturing, and the coupling portion and the test object are formed from identical additive manufacturing materials.

15. The method of claim 14, wherein the additive manufacturing materials include at least one of a polymer, a ceramic, and a metal.

16. The method of claim 13, wherein the additive manufacturing technique includes at least one of vat polymerization material jetting, binder jetting, material extrusion, power bed fusion, sheet lamination, or direct energy deposition.

17. The method of claim 13, wherein the ultrasonic inspection is performed to determine a specified design configuration of the test object.

18. The method of claim 13, further comprising providing results of the ultrasonic inspection of the test object.

19. The method of claim 13, wherein forming the adaptor includes forming an alignment interface within the coupling portion of the adaptor, the alignment interface configured to position the adaptor in continuous contact with a surface of the test object through which the axis of force transmission extends at a first location.

* * * * *